(12) United States Patent
Alberini et al.

(10) Patent No.: US 8,646,748 B2
(45) Date of Patent: Feb. 11, 2014

(54) PRESSURE REGULATOR

(75) Inventors: Viliam Alberini, Massenzatico (IT);
Ercole Sangregorio, Casamicciola Terme (IT)

(73) Assignee: Landi Renzo S.p.A. (IT)

( * ) Notice: Subject to any disclaimer, the term of this patent is extended or adjusted under 35 U.S.C. 154(b) by 414 days.

(21) Appl. No.: 12/522,473

(22) PCT Filed: Jan. 9, 2008

(86) PCT No.: PCT/IB2008/000035
§ 371 (c)(1),
(2), (4) Date: Sep. 9, 2009

(87) PCT Pub. No.: WO2008/087511
PCT Pub. Date: Jul. 24, 2008

(65) Prior Publication Data
US 2010/0108161 A1 May 6, 2010

(30) Foreign Application Priority Data
Jan. 11, 2007 (IT) .............................. MO2007A0004

(51) Int. Cl.
*F16K 31/40* (2006.01)
*F16K 31/383* (2006.01)

(52) U.S. Cl.
USPC ..................................... 251/30.02; 137/487.5

(58) Field of Classification Search
USPC ........ 251/25, 28, 30.01, 30.02, 30.03, 62, 63, 251/63.5, 30.05; 137/487.5
See application file for complete search history.

(56) References Cited

U.S. PATENT DOCUMENTS

| | | | | |
|---|---|---|---|---|
| 3,424,427 A * | 1/1969 | Ruchser | ...................... | 251/30.02 |
| 3,797,526 A * | 3/1974 | Champeon | ............... | 137/630.14 |
| 5,520,366 A * | 5/1996 | Elliott | ......................... | 251/30.01 |
| 5,687,759 A * | 11/1997 | Tan | ................................ | 137/486 |
| 5,752,489 A | 5/1998 | Henderson et al. | | |
| 6,619,612 B2 * | 9/2003 | Freisinger et al. | ......... | 251/30.03 |
| 6,712,088 B2 * | 3/2004 | Gamou et al. | ................ | 137/341 |
| 6,758,233 B2 * | 7/2004 | Sulatisky et al. | ............... | 137/14 |
| 6,869,060 B2 * | 3/2005 | Barber et al. | ............... | 251/30.02 |
| 2007/0290152 A1 * | 12/2007 | Ma et al. | ..................... | 251/30.01 |

FOREIGN PATENT DOCUMENTS

| | | |
|---|---|---|
| DE | 10346208 A1 | 4/2005 |
| JP | 60104752 A | 6/1985 |
| RU | 2150138 C1 | 5/2000 |
| SU | 771629 | 10/1980 |
| WO | 92/05357 A1 | 4/1992 |

* cited by examiner

*Primary Examiner* — John K Fristoe, Jr.
*Assistant Examiner* — Jonathan Waddy
(74) *Attorney, Agent, or Firm* — Laubscher & Laubscher, P.C.

(57) ABSTRACT

A fluid pressure regulator includes a regulation chamber arrangement in which a piston is received, in the regulation chamber arrangement, a first chamber and a second chamber being defined by opposite parts of the piston. The first chamber and the second chamber include respectively a first inlet and a second inlet for the fluid, the first inlet and the second inlet being connected to a first environment at a first pressure. The first chamber and the second chamber include respectively a first outlet and a second outlet for the fluid, the first outlet and the second outlet being connected to a second environment at a second pressure. The piston is movable in the regulation chamber arrangement in response to a variation of pressure of the fluid in the first chamber to open/close the second outlet to regulate the second pressure. The fluid pressure regulator includes a valve device to open/close the first outlet to induce the pressure variation in the first chamber.

8 Claims, 2 Drawing Sheets

PRESSURE REGULATOR

This application is a national phase of PCT International Application No. PCT/IB2008/000035 filed Jan. 9, 2008. PCT/IB2008/000035 claims priority to IT Application No. MO2007A000004 filed Jan. 11, 2007. The entire contents of these applications are incorporated herein by reference.

BACKGROUND OF THE INVENTION

The invention relates to a pressure regulator for regulating the pressure of a fluid.

In particular, the invention refers to a pressure regulator that can be used in a gaseous fuel supply system, such as for example, natural gas, liquefied petroleum gas, hydrogen or similar, for regulating the pressure of the gaseous fuel flowing from a pressurized gaseous fuel source to an operating device, such as for example an internal combustion engine.

Mechanical pressure regulators are known, comprising a body inside which a regulation chamber is obtained.

Inside the regulation chamber a diaphragm or a piston is positioned, which divides this regulation chamber into a first chamber or upper chamber, and a second chamber or lower chamber.

The first chamber is connected to an environment at a reference pressure, for example, atmospheric pressure.

The second chamber comprises an inlet and an outlet for the gaseous fuel connected respectively to a source of gaseous fuel and to an operating device of gaseous fuel.

The known mechanical regulators furthermore comprise a valve for regulating a flow of gaseous fuel between the inlet and the outlet.

This valve is fixed to a first side of the diaphragm/piston, facing the second chamber, and is provided with a seat positioned in the second chamber, at the fuel flow inlet, between the inlet and outlet.

The known mechanical regulators furthermore comprise a spring positioned in the first chamber and fixed to a second side of the diaphragm/piston, facing the first chamber and opposite the first side.

During use, the spring exerts an elastic force on the diaphragm/piston, which acts on the valve by positioning and maintaining the valve at a certain distance from the seat in such a manner as to define a port through which a desired flow of gaseous fuel is allowed to flow.

In other words, by means of the diaphragm/piston, the spring positions the valve in a determined operating position which corresponds to a desired outlet pressure from the regulator. A limit of known mechanical regulators is that the outlet pressure varies with respect to a nominal pressure value in the operating range of the regulator, i.e. the outlet pressure changes with variation of an inlet regulator pressure and a required flow rate.

A further limit of known mechanical regulators is that they do not allow to regulate of the above-mentioned outlet pressure during operation, i.e. they work with a constant nominal outlet pressure which depends on the above-mentioned reference pressure.

In fact, this outlet pressure is determined by the operating position of the valve which depends on the elastic force exerted by the spring on the valve by means of the diaphragm/piston.

This elastic force depends on the features of the spring, on the preload and, in particular, on the elastic constant, and therefore, cannot be modified during operation.

A still further limit is that known mechanical regulators need periodic calibration in order to maintain and thus preserve the original performances.

This is due to the diaphragm which is subject to a time drift and permanent deformations.

Another drawback is that these regulators cannot be used at low temperatures, in the absence of a heat exchange between the gaseous fuel and a suitable heat source.

This is due to the diaphragm which, because of its sensitivity to temperature, becomes rigid at low temperatures.

SUMMARY OF THE INVENTION

An object of the invention is to improve the pressure regulators.

A further object is to obtain pressure regulators which enable the outlet pressure to be changed.

A still further object is to provide pressure regulators which can be controlled during operation.

A still further object is to make pressure regulators that are more reliable and precise than known regulators, without the need to carry out periodic calibrations during the useful life thereof.

A still further object is to provide pressure regulators having a lower sensitivity to low temperatures than known mechanical regulators.

According to the invention, there is provided a fluid pressure regulator comprising a regulation chamber arrangement in which a piston is received. The arrangement includes a first chamber and a second chamber defined by opposite parts of the piston, the first chamber and the second chamber comprising respectively a first inlet and a second inlet for the fluid. The first inlet and the second inlet are connected to a first environment at a first pressure, the first chamber and the second chamber comprising respectively a first outlet and a second outlet for the fluid, the first outlet and the second outlet are connected to a second environment at a second pressure, the piston being movable in the regulation chamber arrangement in response to a variation of pressure of the fluid in the first chamber to open/close the second outlet to regulate the second pressure the fluid pressure regulator includes a valve means device to open/close the first outlet to induce the pressure variation in the first chamber.

In one embodiment of the invention, the regulator comprises a control and management unit for controlling the valve device by means of pulse width modulation cycles.

This enables pressure regulators to be obtained, which allows, during operation, to regulate and change said second pressure electronically.

In fact, in said control and management unit a pressure set-point value is entered, representing said second pressure, this set-point value may be fixed or variable.

Said control and management unit then compares said second pressure measured by a pressure sensor positioned downstream of said second outlet with the pressure set-point.

Subsequently, in the event of a possible deviation, detected between the second outlet pressure and the pressure set-point, the control and management unit processes an electric signal which is sent to the valve device, which creates a pressure variation in the first chamber that enables the piston to be moved in order to make the second pressure equal to the pressure set-point.

Furthermore, the regulator according to the invention, is more reliable and precise as compared to known mechanical regulators and can also be used at low temperatures.

In fact, said regulator does not use the diaphragm used in known mechanical regulators, which was sensitive to temperature and time drift.

BRIEF DESCRIPTION OF THE FIGURES

The invention can be better understood and carried into effect with reference to the attached drawings in which some embodiments of the invention are shown by way of non-limiting example, in which.

DETAILED DESCRIPTION

Figure 1:
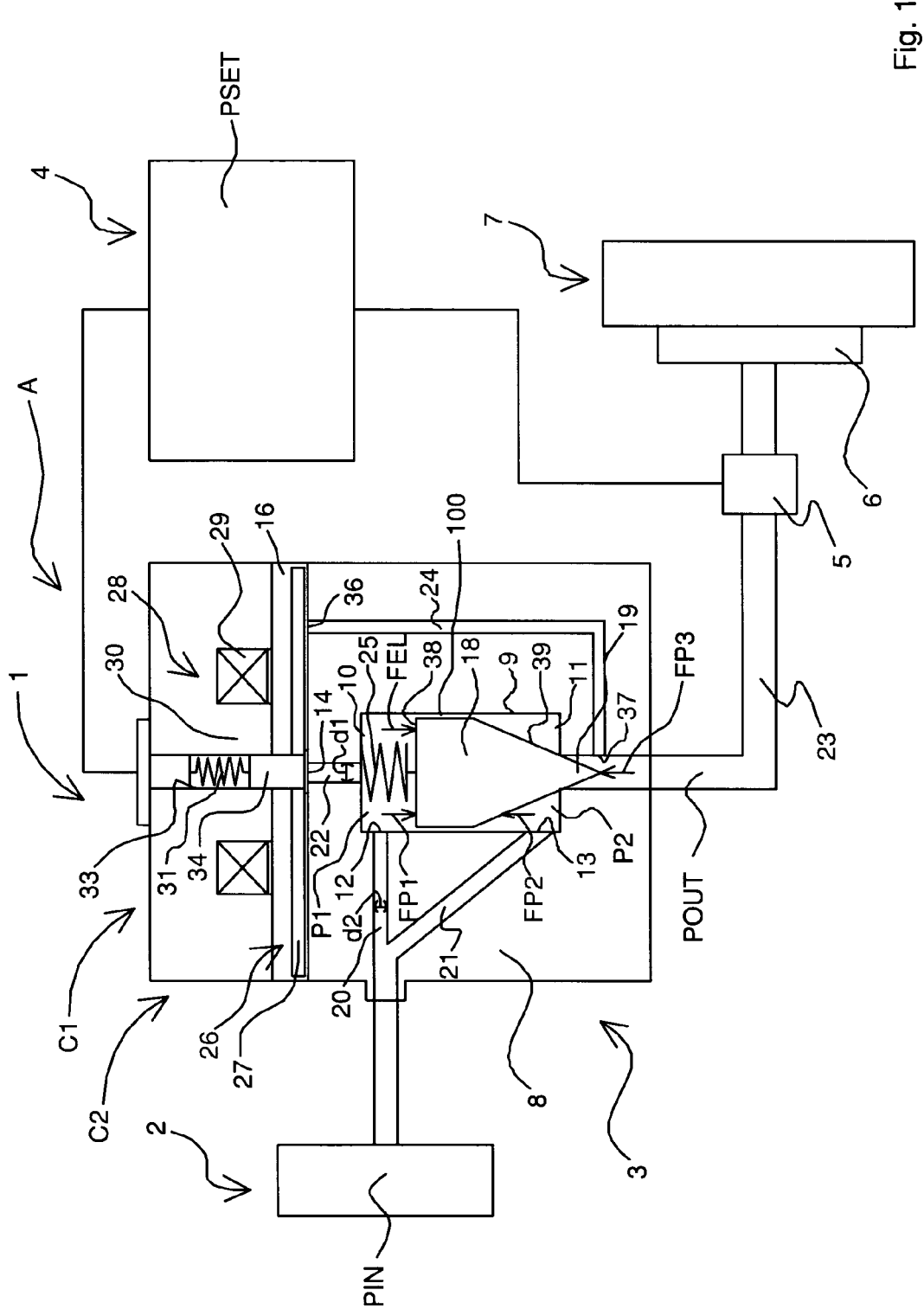
FIG. 1 is a schematic view of a pressure regulator, in a first operating configuration, inserted in a gaseous fuel supply system.
Figure 2:
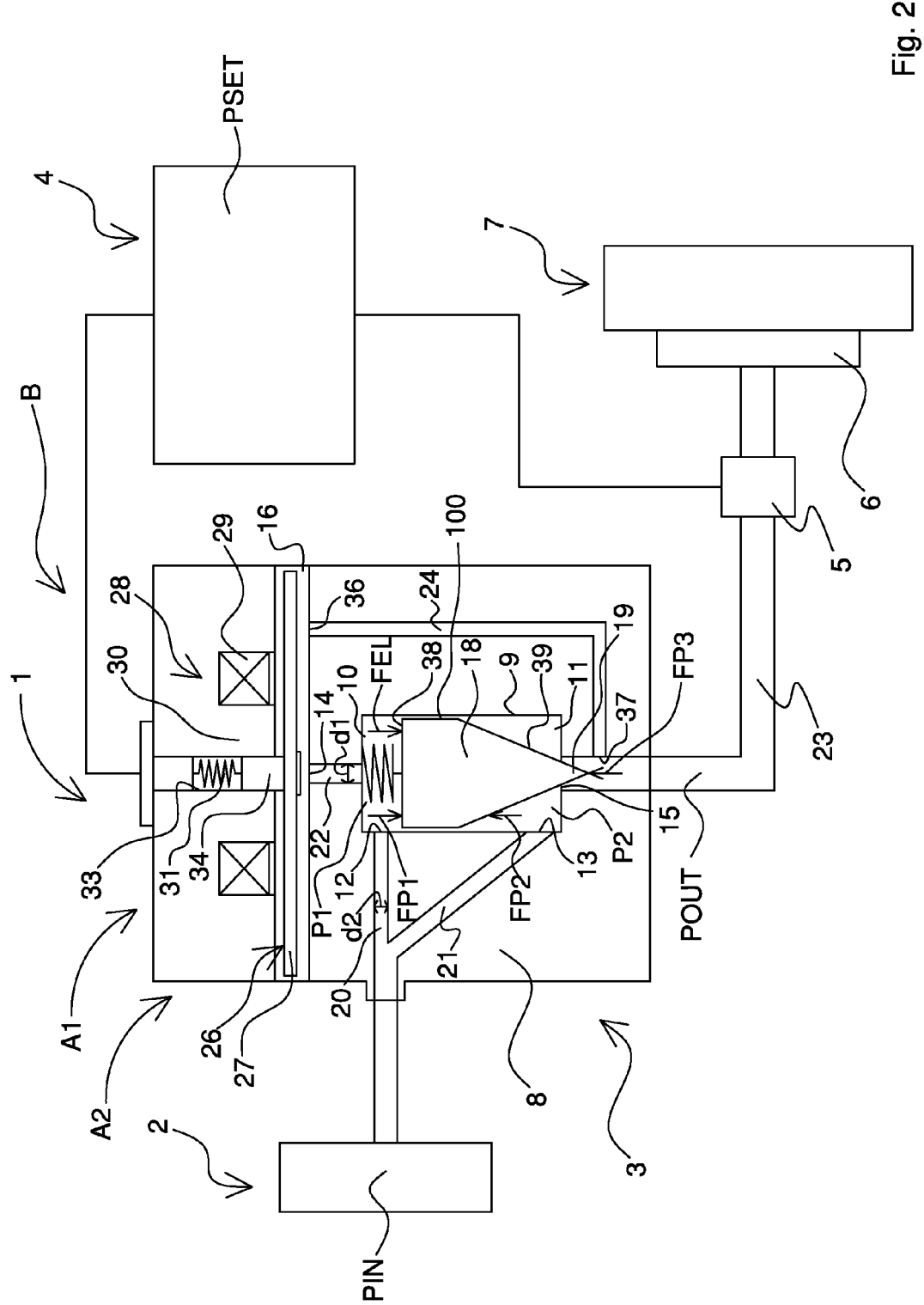
FIG. 2 is a schematic view of the pressure regulator of FIG. 1 in a second operating configuration.

With reference to FIG. 1 and FIG. 2, a gaseous fuel supply system 1 is shown, such as for example natural gas, liquefied petroleum gas, hydrogen or similar, comprising a tank 2 or cylinder, arranged for containing gaseous fuel at a desired inlet pressure PIN.

The tank 2 supplies the gaseous fuel at inlet pressure PIN to a pressure regulator 3 arranged for supplying gaseous fuel at an outlet pressure POUT to a fuel dosing device 6, for example, injectors, of a gaseous fuel operating device 7, for example, an internal combustion engine.

In other words, the regulator 3 is interposed between the tank 2 and the fuel dosing device 6, receives gaseous fuel from the tank 2 at an inlet pressure PIN and supplies the gaseous fuel to the fuel dosing device 6 at a fixed or variable desired outlet pressure value, POUT.

The regulator 3 comprises a body 8 inside which a regulation chamber 9 is obtained.

The regulation chamber 9 is provided with a first chamber 10 and a second chamber 11, the first chamber 10 being operatively positioned above the second chamber 11.

The first chamber 10 and second chamber 11 comprise, respectively, a first inlet 12 and a second inlet 13 for the gaseous fuel, the first inlet 12 and second inlet 13 being connected to the tank 2 by means of a first conduit 20 and a second conduit 21, respectively.

Furthermore, the first chamber 10 and second chamber 11 comprise, respectively, a first outlet 14 and a second outlet 15 (FIG. 2) connected to a control chamber 16 of regulator 3 and to the fuel dosing device 6 by means of a third conduit 22 and a fourth conduit 23, respectively.

The regulator 3 further comprises a fifth conduit 24 provided with a first door 36 and a second door 37 arranged for connecting fifth conduit 24 to control chamber 16 and to fourth conduit 23, respectively.

The regulator 3 is further provided with a piston 18 positioned in the regulation chamber 9 so as to define the first chamber 10 and the second chamber 11.

In particular, between the piston 18 and the regulation chamber 9, a passage 100 is provided, suitably sized, arranged for allowing the flow of gaseous fuel between the first chamber 10 and the second chamber 11.

The piston 18 comprises a first end surface 38 and a second end surface 39, opposite one another and facing, respectively, the first chamber 10 and second chamber 11, the first end surface 38 being wider than the second end surface 39.

The piston 18 is movable between a first closed position C1, shown in FIG. 1, and a first open position A1, shown in FIG. 2, in which the piston 18 respectively prevents/allows the flowing of the gaseous fuel from the second chamber 11 to fuel dosing device 6 by means of the second outlet 15.

In other words, the piston 18 is movable towards or away from the second outlet 15, so as to partially or completely occlude the second outlet 15 by means of an end 19 of the piston 18.

In this manner, it is possible to change the dimension of a port, not shown, defined between the end 19 and the second outlet 15, to allow a controlled passage of gaseous fuel from second chamber 11 to fuel dosing device 6.

The regulator 3 further comprises a first spring 25, positioned in the first chamber 10 and arranged for moving the piston 18 towards the second outlet 15.

The regulator 3 further comprises a solenoid valve 26 arranged for controlling a first pressure P1 present in the first chamber 10.

The solenoid valve 26 is movable between a second closed position C2 shown in FIG. 1, and a second open position A2 shown in FIG. 2.

The solenoid valve 26 is provided with a shutter 27 arranged for opening/closing the first outlet 14 of the first chamber 10, respectively, when the solenoid valve 26 is in the second open position A2 and in the second closed position C2, the shutter 27 being controlled to move away from the first outlet 14 by a solenoid 28 which comprises a coil 29 wound around a supporting element 30.

Inside the coil 29 a passage 33 is obtained inside which a pin 34 fixed to the shutter 27 can slide.

The regulator 3 further comprises a second spring 31 resting on the pin 34 and positioned in the passage 33.

In particular, the second spring 31 is arranged for positioning the solenoid valve 26 in the second closed position C2, i.e. to push the shutter 27 against the first outlet 14 so as to close the first outlet 14.

The solenoid valve 26 is controlled by a control and management unit 4 using a pulse width modulated square wave signal, or PWM (Pulse Width Modulation) and/or a frequency modulated signal.

In the control and management unit 4 a pressure set-point value PSET is entered, which represents the desired outlet pressure POUT from the regulator 3, this set-point value PSET may be fixed or variable.

The control and management unit 4 compares the outlet pressure POUT measured by a pressure sensor 5 positioned downstream of the second outlet 15 with the set-point pressure PSET using, for example, a proportional, integral and differential (PID) control algorithm, or a proportional and integral (PI) control algorithm.

Subsequently, in function of a possible deviation, detected between the outlet pressure POUT and the pressure set-point PSET, the control and management unit 4 processes an electric signal which is sent to the solenoid 28, which suitably drives the shutter 27 in order to make the outlet pressure POUT equal to the pressure set-point PSET.

The operation of the regulator 3 is described below, with reference to FIGS. 1 and 2, in which regulator 3 is in a first configuration A and in a second configuration B, respectively.

In the first configuration A, the coil 29 is not energized and the solenoid valve 26 is in the second closed position C2, in which, owing to a pressing force exerted by the second spring 31, the shutter 27 is kept abutted against the first outlet 14, i.e. closes the first outlet 14.

In the first configuration A, a first force FP1 due to the first pressure P1 present in the first chamber 10 and an elastic force FEL exerted by the first spring 25 act on first end surface 38 of the piston 18 by pushing the piston 18 towards the second outlet 15.

On the other hand, in the first configuration A, a second force FP2 due to a second pressure P2 present in the second chamber 11 and a third force FP3 due to the outlet pressure POUT act on the second end surface 39 of the piston 18, the outlet pressure POUT being lesser than the input pressure PIN which is present in fourth conduit 23, by pushing the piston 18 away from the outlet 15.

In the first configuration A, the first pressure P1 is equal to the second pressure P2 and both are equal to the inlet pressure PIN but, since the first end surface 38 has a planar configuration and the second end surface 39 tapers toward the second outlet, the cross-sectional area of the first end surface is greater than the cross-sectional area of the second end surface 39 so that the module of the first force FP1 will be greater than the module of the second force FP2 and the sum of the modules of the first force FP1 and the elastic force FEL will be greater than the sum of the modules of the second force FP2 and the third force FP3, and therefore, the piston 18 is kept in the first closed position C1.

In the second configuration B, the coil 29 is energized and the solenoid valve 26 is in the second open position A2, in which the shutter 27 is raised with respect to the first outlet 14.

In this manner, since the first outlet 14 has a first diameter d1 greater than a second diameter d2 of the first inlet 12, there is a flow of gaseous fuel from the first chamber 10 towards the control chamber 16 and from the control chamber 16 towards the fuel dosing device 6 by means of the fifth conduit 24.

This flow of gaseous fuel causes reduction of the first pressure P1 in the first chamber 10 and consequently of the first force FP1.

When the first force FP1 reaches such a value for which the sum of the modules of the first force FP1 and the elastic force FEL is lesser than the sum of the modules of the second force FP2 and the third force FP3, the piston 18 is moved away from the second outlet 15, i.e. the piston 18 passes from the first closed position C2 to the first open position A1, in which a controlled flow of gaseous fuel flows towards the fuel dosing device 6 from the second chamber 11 which is constantly supplied with gaseous fuel at inlet pressure PIN.

Subsequently, the pressure sensor 5 detects the outlet pressure POUT at the regulator outlet 3 and sends a signal to the control and management unit 4 which compares this outlet pressure POUT with the pressure set-point PSET and sends appropriate control signals to the solenoid valve 26 if the solenoid valve 26 detects a deviation between these values.

The regulator 3 further allows effective regulation of a minimum flow of gaseous fuel towards the fuel dosing device 6, also in maximum pressure conditions for the above-mentioned gaseous fuel.

In fact, by operating the solenoid valve 26 suitably, it is possible to let a small flow of gaseous fuel flow out from the first chamber 10, in such a manner that the variation of the first pressure P1 in the first chamber 10 is not such as to move the piston 18, which remains in the first closed position C1.

This small flow, controlled by the control and management unit 4, flows from the first chamber 10 towards the fuel dosing device 6 by means of the fifth conduit 24.

In other words, it is possible to provide a small flow of fluid without operating the piston 18, i.e. by-passing the piston 18.

It should be noted how the solenoid valve 26, suitably controlled by the control and management unit 4, enables the first pressure P1 to be regulated and thereby regulates the start and the duration of the delivery of gaseous fuel towards the fuel dosing device 6.

In order to ensure optimum operation of the regulator 3, the first diameter d1 must be small enough to contain the pressure forces acting on the shutter 27.

In other words, the first diameter d1 must be small enough to allow the second spring 31 to keep the solenoid valve 26 in the second closing position C2 when the coil 29 is not energized.

Furthermore, the first diameter d1 must be greater than the second diameter d2 so that a flow rate of gaseous fuel exiting the first chamber 10 is greater than a further flow rate of gaseous fuel entering the first chamber 10.

Again, a first volume defined by the first chamber 10 must be much lower, when the piston 18 is in the first closing position C1, than a second volume defined by the second chamber 11.

This enables in a gaseous fuel inlet step, the first chamber 10 to be filled faster as compared to the second chamber 11 to avoid undesirable opening, i.e. not controlled by the solenoid valve 26, of the piston 18.

Besides, it should be noted how the regulator 3 can be inserted and used in any position in a gas pipe (not shown) between a supply device and a operating device, or can be used as a regulator for vehicles with engines supplied by fuel cell, or used for regulating the pressure of any fluid. Also it should be noted how the regulator 3 is controlled, during operation, by the control and management unit 4 which allows, in a first case to regulate and in a second case to change, the outlet pressure POUT electronically.

In the first case, the electronic control is able to compensate any drifts, which may occur during the life of the regulator 3, without the need for periodic calibrations. In the second case, the electronic control is able to compensate any drifts of operating device 7 of the gaseous fuel and/or provide the outlet pressure POUT required to satisfy any evolved strategies of the operating device 7. Furthermore, the electronic control is able to diagnose any faults of the regulator 3 as well as the operating device 7 in order to make a safety strategy.

The invention claimed is:

1. A gaseous fuel regulator for supplying pressure regulated gaseous fuel from a fuel tank to a fuel dosing device, comprising
(a) a housing;
(b) a regulation chamber arranged in said housing;
(c) a piston arranged in said regulation chamber in a loose fit configuration to define a first chamber and a second chamber within said regulation chamber on opposite sides of said piston and an annular passage between said piston and a side wall of said regulation chamber, said first chamber including a first inlet and said second chamber including a second inlet for delivering gaseous fuel to said first and second chambers, respectively, from the fuel tank at an inlet pressure, said first chamber including a first outlet and said second chamber including a second outlet connected with an outlet conduit for delivering said gaseous fuel at an outlet pressure to the dosing device, said piston having a first surface facing said first outlet and a second surface facing said second outlet, said first surface having a planar configuration and said second surface having a configuration tapering toward said second outlet, said piston being displaced within said regulation chamber in response to a change in pressure of said gaseous fuel in said first chamber to open and close said second outlet from said second chamber to change said outlet pressure, said passage allowing a flow of said gaseous fuel between said first chamber and said second chamber;
(d) a control chamber arranged in said housing and connected with said first chamber via said first outlet;
(e) a valve mechanism arranged in said housing and including a solenoid valve comprising a shutter arranged in said control chamber for opening and closing said first outlet from said first chamber to change the pressure of said gaseous fuel in said first chamber;
(f) a bypass conduit connecting said control chamber with said outlet conduit;
(g) a pressure sensor connected with said outlet conduit for measuring said outlet pressure; and
(h) a control device connected with said pressure sensor and with said valve mechanism, said control device comparing said outlet pressure with a set pressure and generating an electric signal when said outlet pressure deviates from said set pressure to operate said valve mechanism by way of pulse width modulation cycles to open and close said first outlet in order to vary the pressure within said first chamber, thereby to operate said piston to bring the outlet pressure to the set pressure.

2. Regulator according to claim 1, wherein said first chamber and said second chamber define a first volume and a second volume, respectively, said first volume being less than said second volume.

3. Regulator according to claim 1, wherein said first outlet has a first diameter greater than a second diameter of said first inlet.

4. Regulator according to claim 1, and comprising a first pushing element positioned in said first chamber for pushing said piston towards said second outlet.

5. Regulator according to claim 4, wherein said first pushing element comprises a first elastic element.

6. Regulator according to claim 1, and comprising a second pushing element for pushing said valve device towards said first outlet.

7. Regulator according to claim 6, wherein said second pushing element comprises a second elastic element.

8. A method for regulating a gaseous fuel pressure, wherein the method comprises using a regulator as claimed in claim 1, in a gaseous fuel supply system.

* * * * *